US006162311A

United States Patent [19]

Gordon et al.

[11] Patent Number: 6,162,311

[45] Date of Patent: Dec. 19, 2000

[54] COMPOSITE MAGNETIC CERAMIC TOROIDS

[75] Inventors: Stuart Gordon, Harrison, N.Y.; Robert Horvath, Mount Olive, N.J.

[73] Assignee: MMG of North America, Inc., Paterson, N.J.

[21] Appl. No.: 09/428,628

[22] Filed: Oct. 27, 1999

Related U.S. Application Data

[60] Provisional application No. 60/106,135, Oct. 29, 1998.

[51] Int. Cl.[7] .............................. B32B 1/08; B32B 18/00; B32B 31/18; B32B 31/26

[52] U.S. Cl. .................................... 156/89.11; 156/89.12; 156/250; 428/693

[58] Field of Search .............................. 156/89.11, 89.12, 156/250, 254; 428/693

[56] References Cited

U.S. PATENT DOCUMENTS

| | | |
|---|---|---|
| 1,774,856 | 9/1930 | Deventer . |
| 1,832,290 | 11/1931 | Fischer . |
| 3,007,222 | 11/1961 | Ragan . |
| 3,097,929 | 7/1963 | Ragan . |
| 3,238,484 | 3/1966 | Dacey . |
| 3,483,497 | 12/1969 | Clarke . |
| 3,535,200 | 10/1970 | Bergstrom . |
| 3,538,600 | 11/1970 | Farrell et al. . |
| 3,566,462 | 3/1971 | Moore . |
| 3,771,396 | 11/1973 | Im . |
| 3,913,080 | 10/1975 | Leo . |
| 4,045,864 | 9/1977 | Morokuma . |
| 4,126,723 | 11/1978 | Huntt . |
| 4,182,643 | 1/1980 | Calderon, Jr. . |
| 4,199,744 | 4/1980 | Aldridge et al. . |
| 4,255,494 | 3/1981 | Reen et al. . |
| 4,316,923 | 2/1982 | Monforte . |
| 4,584,035 | 4/1986 | Gukkenberger . |
| 5,084,958 | 2/1992 | Yerman . |
| 5,123,156 | 6/1992 | Meunier . |
| 5,134,770 | 8/1992 | Yerman . |
| 5,138,546 | 8/1992 | Johnson . |
| 5,144,741 | 9/1992 | Ohta . |
| 5,165,162 | 11/1992 | Charles . |
| 5,479,695 | 1/1996 | Grader . |
| 5,584,116 | 12/1996 | Yoon . |
| 5,655,287 | 8/1997 | Ushiro . |
| 5,772,820 | 6/1998 | Schoch . |
| 5,828,271 | 10/1998 | Stitzer . |
| 5,838,214 | 11/1998 | Goel et al. . |
| 5,876,539 | 3/1999 | Bailey et al. . |

OTHER PUBLICATIONS

Tape Castin—Richard E. Mistler, Keramos Industries, Inc., Reprinted from "Engineered Materials Handbook" vol. 4: Ceramics and Glasses, 1992.

*Primary Examiner*—Curtis Mayes

*Attorney, Agent, or Firm*—Allen N. Friedman; McCarter & English, LLP

[57] ABSTRACT

Disclosed is a method of producing gapped ferrite toroids without the necessity of machining. This allows for the highly efficient production of tightly controlled energy storage magnetic components and stable inductors. Composite toroids of the invention have a wide range of applications, and could be used as substitutes for more costly and less operationally efficient magnetic components. This invention provides a method of producing composite toroids that include a nonmagnetic gap, by utilizing a layer-forming method, such as tape casting, and subsequently co-firing a monolithic composite magnetic and non-magnetic ceramic structure produced by stacking the layers. The toroids are punched from the stacked layers prior to final firing. This novel method provides a means for producing very well controlled gapped structures.

18 Claims, 10 Drawing Sheets

COMPOSITE MAGNETIC CERAMIC TOROIDS

RELATED APPLICATIONS

This application claims priority from Provisional Application Ser. No. 60/106,135, filed Oct. 29, 1998

GOVERNMENT FUNDED RESEARCH

Not applicable

BACKGROUND OF THE INVENTION

1. Field of the Invention

The invention is in the field of fabrication of ferromagnetic ceramic devices, primarily for incorporation in electronic circuits.

2. Brief Description of the Background Art

Ferrite toroids are used in electronic circuits as inductors and transformers. Some applications require toroids in which the magnetic path is interrupted by a non-magnetic gap. Gapped ferrite toroids are currently manufactured by cutting a single gap in a toroid using a diamond blade or some other cutting method, as shown in FIG. 1. Alternatively, very elaborate machining methods may be used to produce double gapped toroids. This latter procedure may involve the cementing of blocks of ferrite together, separated by a spacer which joins the two blocks. Gapped toroids are produced by core drilling toroids from the bonded blocks, with the core drill centered on the gap between the blocks. This method is shown in FIG. 2.

Several other kinds of magnetic devices are fabricated from a combination of magnetic ferrite elements and non-magnetic spacers. For example, the fabrication of reading and writing heads for magnetic tape and magnetic disc recording is shown in U.S. Pat. No. 4,045,864 and U.S. Pat. No. 4,182,643. U.S. Pat. No. 5,655,287 discloses multilayer nonmagnetic ceramic green sheets with printed metalic conductors compressed to form a coil and surrounded by magnetic green sheets to form the magnetic circuit and fired to form a monolithic body. U.S. Pat. No. 5,479,695 discloses similarly layered and co-fired magnetic and nonmagnetic ceramics electronic components. U.S. Pat. No. 3,535,200 discloses a high coercive force permanent magnet consisting of alternating layers of ceramic ferrites with different magnetic properties compressed and fired together.

SUMMARY OF THE INVENTION

This invention involves a method of producing gapped ferrite toroids without the necessity of machining. This allows for the highly efficient production of tightly controlled energy storage magnetic components and stable inductors. Composite toroids of the invention have a wide range of applications, and could be used as substitutes for more costly and less operationally efficient magnetic components. This invention provides a method of producing composite toroids that include a nonmagnetic gap, by utilizing a layer-forming method, such as tape casting, and subsequently co-firing a monolithic magnetic and non-magnetic ceramic structure produced by stacking the layers. The toroids are punched from the stacked layers prior to final firing. This novel method provides a means for producing very well controlled gapped structures, particularly toroids, which can be made at much lower cost, and manufactured at much higher rates than with prior art methods.

DETAILED DESCRIPTION OF THE INVENTION

The present invention relates to the manufacture of ferrite toroids having a gap in their magnetic path, and particularly, to forming said gapped toroids as monolithic structures. Introduction of the gap requires no machining operation. The resulting component is more robust and tight control of the gap width can be maintained. A wide range of ferrite materials can be used as the magnetic medium in the gapped toroidal structure. These include manganese zinc ferrite, and particularly power ferrites, nickel zinc ferrites, lithium zinc ferrites, magnesium manganese ferrites, as well as other commercially used ferrite types. A wide range of ceramics materials can be used for the non-magnetic medium. These include alumina, alumina glass mixtures, cordierite, and cordierite glass mixtures, mullite, and mullite glass mixtures, zirconia, and zirconia glass mixtures, barium titanate, and other titanates, steatite, mixtures of ferrite and non-magnetic ceramics, as well as numerous other non-magnetic or weakly magnetic ceramic materials which can be co-fired with ferrite materials. The addition of a glassy phase to the non-magnetic ceramics allows for modification of their sintering temperature and firing shrinkage. This is important as the non-magnetic ceramic must closely match the thermal properties of the magnetic phase, i.e., the ferrite.

Sheets of the green (i.e., unfired) ferrite precursor material and sheets of the green (i.e., unfired) non-magnetic ceramic material are prepared by employing either aqueous or non-acqueous tape casting. Other sheet forming processes such as roller compaction, stationary slip casting, extrusion, and other related forming methods could be utilized to produce the green sheets. We have chosen to use the tape cast process in the following examples. The tape casting process is described in an article written by Richard E. Mistler, and published in the Engineered Materials Handbook, Vol. 4, 1992. Additional information or exemplary tape casting processes can be found in U.S. Pat. No. 3,007,222, issued Nov. 7, 1961 and U.S. Pat. No. 3,097,929, issued Jul. 16, 1963. The disclosure of the above article and patents is incorporated herein by reference.

Figure 1:
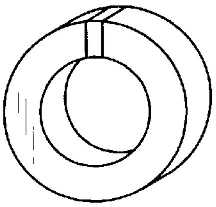
FIG. 1 (PRIOR ART)
FIG. 1 is a perspective view of a conventionally produced gapped toroid involving machining of a ferrite toroid.
Figure 2A:
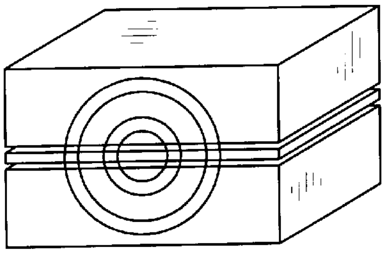
FIG. 2A (PRIOR ART)
FIGS. 2A–2C is a perspective view of a conventionally produced gapped toroid, which relies on machining fired ferrite material.
Figure 2B:
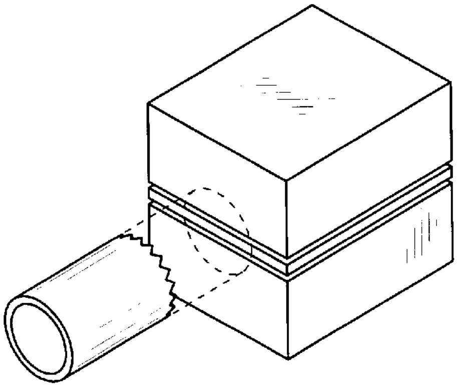
FIG. 2B (PRIOR ART)
Figure 2C:
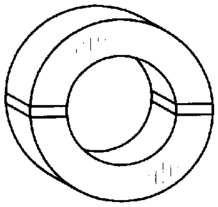
FIG. 2C (PRIOR ART)
Figure 3:
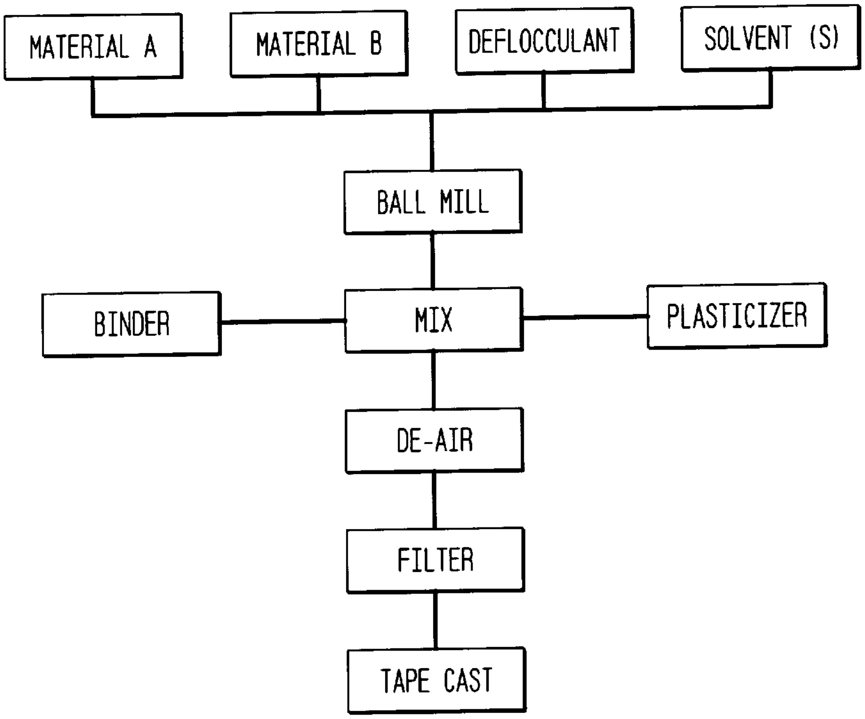
FIG. 3 is a flow diagram of an exemplary tape casting process.
Figure 4:
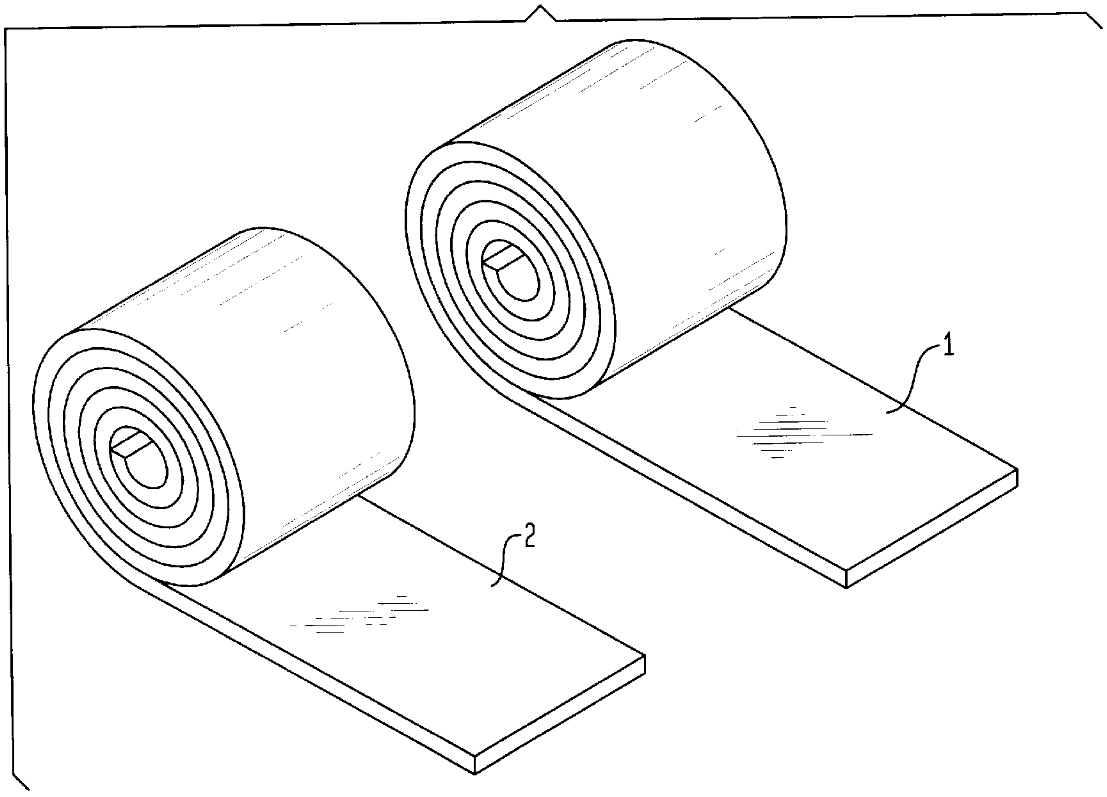
FIG. 4 is a perspective view of ferrite and alumina tapes, produced by the process shown in FIG. 3.

A generic representation of the tape casting process is shown in FIG. 3. The process can be used to prepare sheets of green manganese zinc ferrite and sheets of green alumina glass mixtures, for example, as shown in FIG. 4. These sheets, or tapes as they are commonly called, can have a wide range of widths and thicknesses. The ferrite tapes can typically be up to 0.060" thick, and up to twelve (12) inches wide, but thicker and wider tapes can be prepared. The non-magnetic tapes will generally be thinner, having thickness typically from 0.001" to 0.030", and the same widths as the ferrite tapes. Once again, thicker and wider non-magnetic tapes can be prepared. Any type of ferrite composition such as manganese zinc ferrite, nickel zinc ferrite, magnesium zinc ferrite and others, can be formulated and tape cast. The ferrite forms the magnetically active part of the structure, and the alumina provides the non-magnetic gap. Any non-magnetic ceramic material can be used in place of alumina. Examples would be cordierite, barium titanate, steatite, mullite, zirconia and others. One must prepare the ferrite tapes and non magnetic tapes such that they co-fire properly. An important aspect of this is that the firing shrinkage of the two materials is fairly well matched.

The formulation of the tape casting slurry can vary over a wide range of composition. The tape casting conditions can also vary over a wide range. In one preferred embodiment, the batch of material for the formulation of a tape casting slurry used to produce the ferrite material is as follows:

| MATERIAL | GRAMS |
|---|---|
| Calcined MnZn Ferrite Powder | 1500.00 |
| Z-3 Fish Oil (Menhaden Fish Oil) | 45.00 |
| Xylenes | 307.80 |
| 95% Denatured Ethyl Alcohol | 192.20 |
| Polyvinyl Butyral, B-98 | 90.00 |
| UCON 50HB2000, Polyalkylene Glycol | 63.00 |
| Butyl Benzyl Phthalate, Santicizer 160 | 27.00 |

The Z-3 fish oil is weighed and dissolved in the xylenes by stirring. This solution is poured into a one-gallon steel jar mill, which has a one third charge of steel balls. The ethyl alcohol and ferrite powder are weighed and added to the jar mill. The mixture is milled for 24 hours by rotating the mill at 60 RPM. The S-160 plasticizer, the UCON and the B-98 binder are weighed and added to the material in the jar mill. The contents are milled for an additional 24 hours at 60 RPM. After the final milling cycle, the slurry is poured into a beaker and deaired in a vacuum desiccator at 25 inches mercury for eight minutes. The deaired slurry is transferred to the reservoir of a doctor blade apparatus. The slurry is tape cast using a doctor blade gap of 0.104 inches and a casting speed of 20 inches per minute. The carrier is SIP75, silicone coated Mylar. A low flow of air is introduced over the tape, and the casting is done at room temperature. This procedure will typically produce a 0.070-inch thick green tape.

In one preferred embodiment, the batch of material for the formulation of a tape casting slurry used to produce the non magnetic material is as follows:

| MATERIAL | GRAMS |
|---|---|
| A-16 Alumina, dried at 200° F. for 24 hours | 300.00 |
| EPK Kaolin (Clay) | 150.00 |
| NYTAL 400 Talc | 150.00 |
| Z-3 Fish Oil (Menhaden Fish Oil) | 10.00 |
| Xylenes | 150.00 |
| 95% Denatured Ethyl Alcohol | 150.00 |
| Polyvinyl Butyral, B-98 | 48.00 |
| UCON 50HB2000, Polyalkylene Glycol | 46.00 |
| Butyl Benzyl Phthalate, Santicizer 160 | 46.00 |

The Z-3 fish oil is weighed and dissolved in the xylenes by stirring. This solution is poured into a one-quart alumina jar mill, which has a one third charge of alumina grinding media. The ethyl alcohol and alumina, clay and talc are weighed and added to the jar mill. The mixture is milled for 24 hours by rotating the mill at 60 RPM. The S-160 plasticizer, the UCON and the B-98 binder are weighed and added to the material in the jar mill. The contents are milled for an additional 24 hours at 60 RPM. After the final milling cycle, the slurry is poured into a beaker and deaired in a vacuum desiccator at 25 inches mercury for eight minutes. The deaired slurry is transferred to the reservoir of a doctor blade apparatus. The slurry is tape cast using a doctor blade gap of 0.010 inches and a casting speed of 20 inches per minute. The carrier is SIP75, silicone coated Mylar. Casting is done at room temperature. This procedure will typically produce a 0.005-inch thick green tape.

Figure 5A:
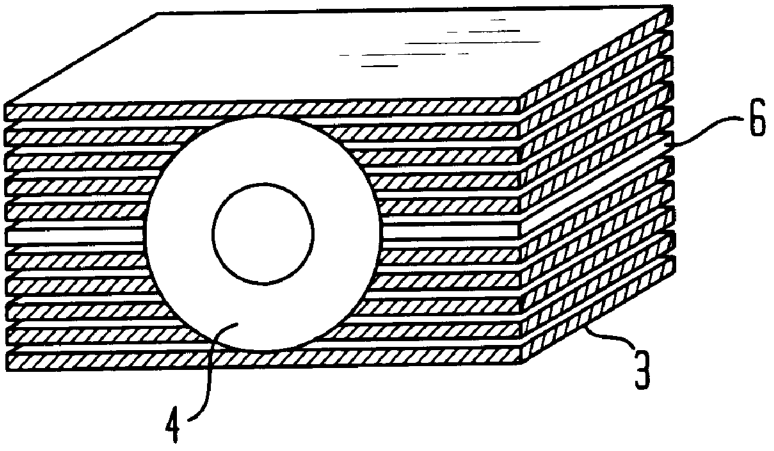
FIG. 5*a* is a drawing of ferrite tape layers and non-magnetic ceramic tape layers which have been laminated into a block.

Two or more layers of ferrite tape 1 (See FIG. 4.), separated by one or more layers of alumina 2 or some other nonmagnetic ceramic material are stacked to an appropriate thickness. The thickness must be greater than the green, that is, unfired toroid outside diameter. The dimensions of the layers can vary widely, with a typical size of 6 by 6 inch square and 0.400" thickness. The thickness is related to the outside diameter of the toroid one wishes to produce accounting for firing shrinkage. After stacking, the ferrite and non-magnetic layers are laminated together. (See FIG. 5*a*.) Lamination is aided by applying heat and pressure to the tape layers. There is a wide range of temperature, pressure and time within which good laminations can be achieved. One typical set of conditions would be a pressure of 1000 psi, a temperature of 400 degrees Fahrenheit and a time of 15 minutes. This could be accomplished in a uniaxial press, or isostatic press. Alternatively, lamination could be accomplished in a hot isostatic press, also with a wide range of pressures, temperatures and times. After lamination, the demarcation between layers is barely discernible, and the structure can be considered as being monolithic. After lamination, the 6.0" by 6.0" (for example) laminated plates are cut into strips 3 having the proper thickness to correspond to the green thickness of the desired toroid (FIG. 5*a*). In the case of a six inch by six inch plate, it would be cut into approximately 12 strips for an approximately 0.500" green toroidal height. The selection of “green” dimension must allow for the approximately 20% shrinkage that occurs upon full firing of the ferrite.

Figure 5B:
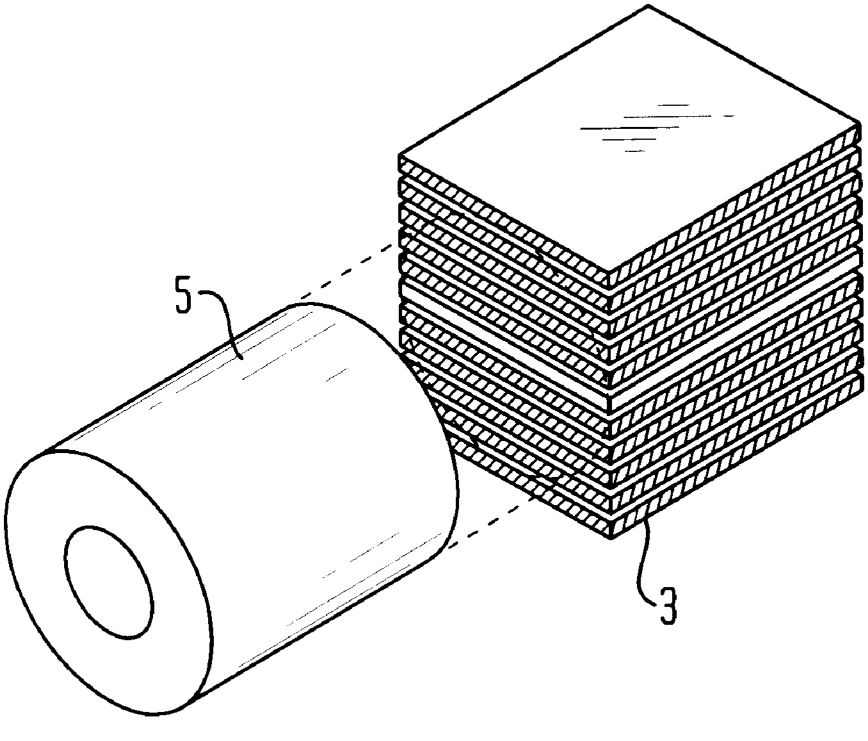
FIG. 5*b* is a perspective view of a toroid being punched from a laminated block.
Figure 5C:
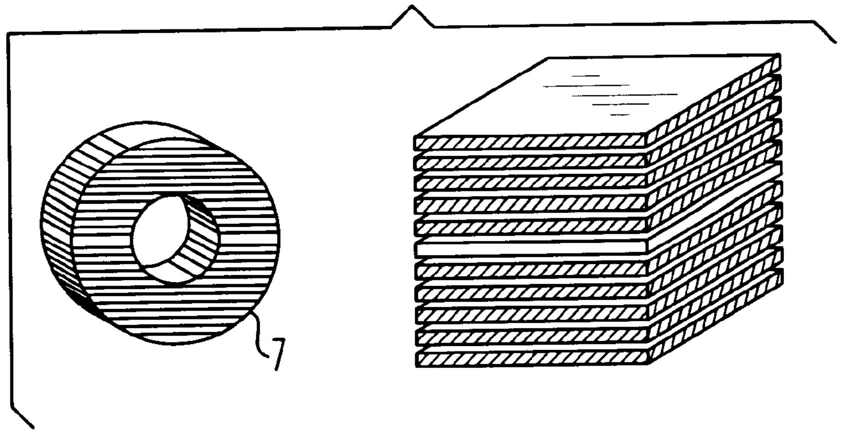
FIG. 5*c* is a perspective view of the resulting "gapped" toroid, and the block precursor.
Figure 6:
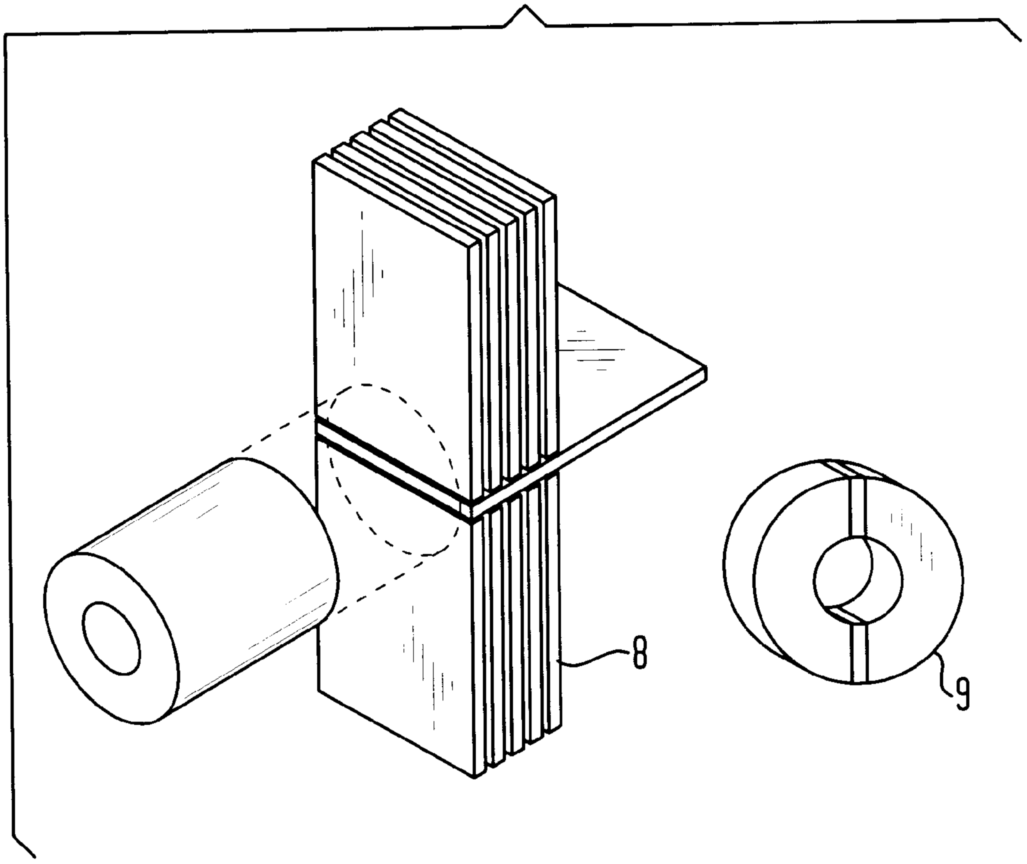
FIG. 6 is a drawing of an alternate arrangement of the ferrite and non-magnetic layers prior to punching.

The next step is to punch out the toroidal shape 4 from the lamination strips 3 (FIG. 5*b*). A punching tool 5, which forms both the outside and inside diameters of the toroid, is centered on the insulating band 6. Using, for example, a punch press the punching tool is forced through the lamination strip (FIG. 5*b*). Alternatively, the outside and inside diameters could be punched sequentially. The punched out "green" toroids 7 (FIG. 5*c*) are collected from the punching operation. This punching in which a layer of the insulating tape is interposed between two groups of ferrite layers of "green" laminate is much less expensive than machining fully fired ferrite. FIG. 6, illustrates an alternate orientation of the ferrite and insulating tape layers prior to 8 and after 9 punching.

Figure 7:
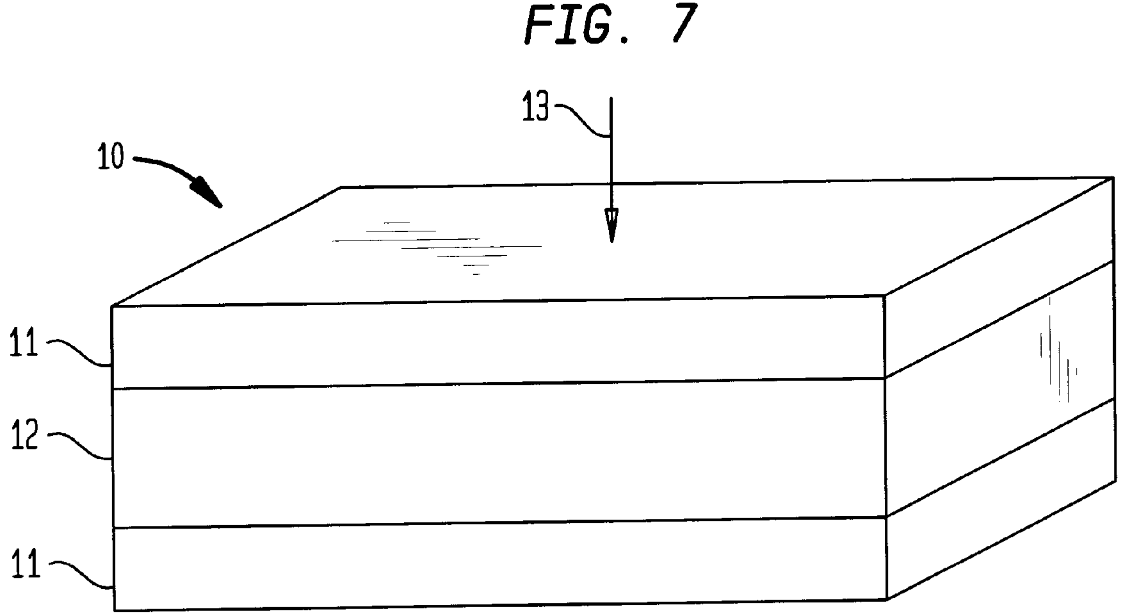
FIG. 7 is a perspective view of a composite ferrite sheet, indicating that the sheet is to be punched perpendicular to the plane of the sheet.
Figure 8:
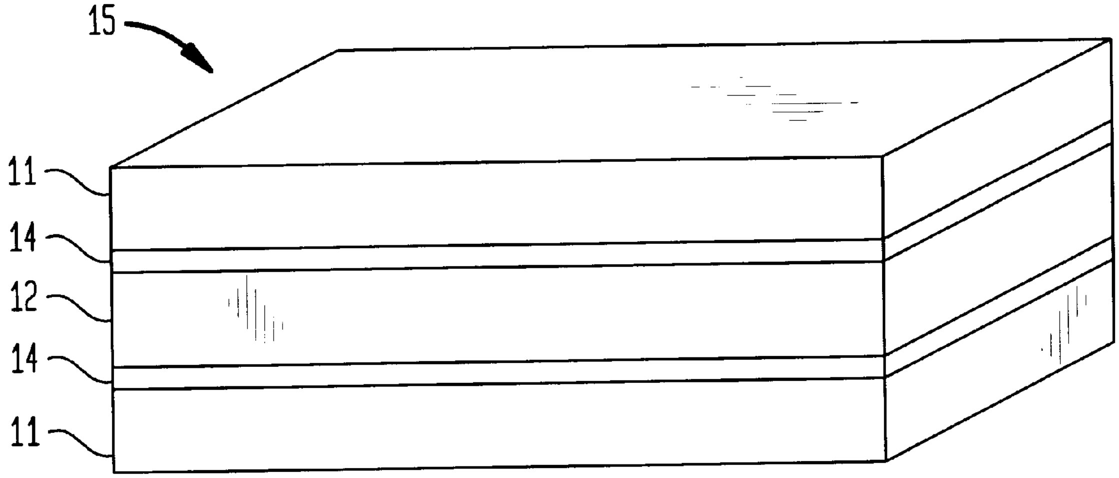
FIG. 8 is a perspective view of a composite ferrite sheet, including two different ferrite materials and two nonmagnetic buffer layers.
Figure 9:
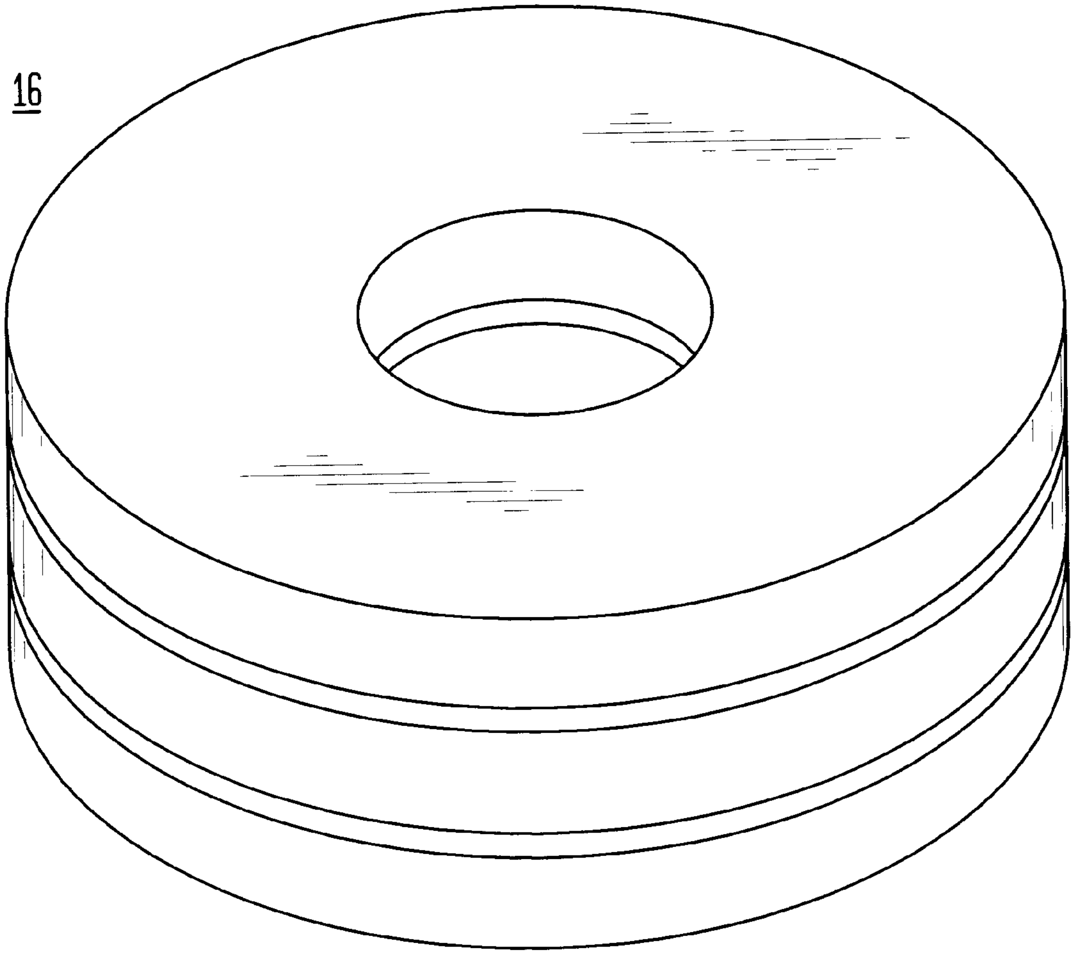
FIG. 9 is a perspective view of a toroid punched from a sheet of FIG. 8, in a punch direction as indicated in FIG. 7.

FIG. 7 illustrates a laminated green sheet 10 composed of two different types of ferrite 11,12. The thickness of this sheet 10 is chosen to correspond to the desired thickness of the toroid product. The arrow 13 indicates that the sheet is to be punched in a direction perpendicular to the plane of the sheet. This is an alternate configuration that may produce devices with properties different from the properties of gapped toroids. FIG. 8 illustrates the incorporation of two nonmagnetic buffer layers 14 used, for example, to magnetically insulate the ferrite layers 11,12 or to accommodate slight differences in the shrinkage of the two different ferrite materials. FIG. 9 illustrates a toroid 16 punched from a composite layer 15 of FIG. 8, in a direction as indicated in FIG. 7.

Subsequent to punching, the gapped toroids produced by the novel method can be processed by conventional means, as is known to those skilled in the art. The toroids are "burnt out", i.e., organics are removed, and then they are "bisque fired", which is a low temperature firing at, for example 1800° F. Following bisquing, the toroids are "tumbled", i.e., burnished, to provide a radius to all edges. Subsequently, the toroids are fired to develop the final magnetic properties and geometry. There are alternate paths that could be followed. After burning out, the parts could be final fired, at, for example 2400° F., and then tumbled. Burn out and bisquing could be separate or combined operations. Burn out and firing could also be combined in one "firing" operation. Following sintering, the parts are tested and often coated with parylene or epoxy.

The type of ferrite used and the thickness of the non-magnetic layer effects magnetic properties. Power loss density, an important property in the case of many applications of gapped toroids, can be modified by the starting ferrite composition. The effective permeability, another important property, is controlled in large part by the thickness of the non-magnetic layer. One advantage of the method is the possibility of tightly controlling the thickness of the non-magnetic layer, and thereby tightly controlling the effective permeability. Another advantage of the method is that one has a monolithic structure that is not subject to separation (as in the case of gaps, which are filled with an organic second phase such as epoxy). The method also offers the possibility of easily producing a double gap, which is preferred to a single gap from a magnetically functional standpoint.

As an example, a manganese zinc ferrite toroid with a 0.010" alumina gap, which was produced using the methods of the invention, had a permeability of 690 and a power loss density of 160 mw/cc at 1000 gauss and 100 kHz.

Figure 10A:
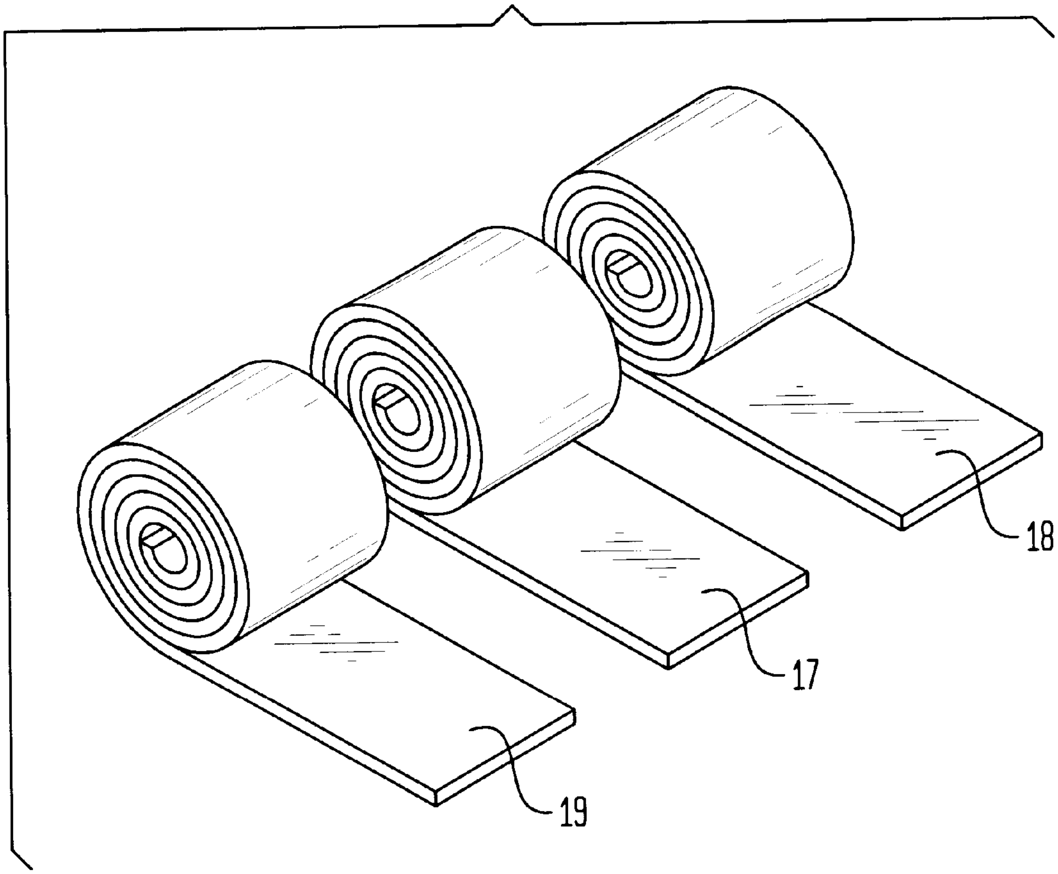
FIG. 10*a* is a perspective view of ferrite, diffusion barrier, and alumina tapes produced by the process shown in FIG. 3.
Figure 10C:
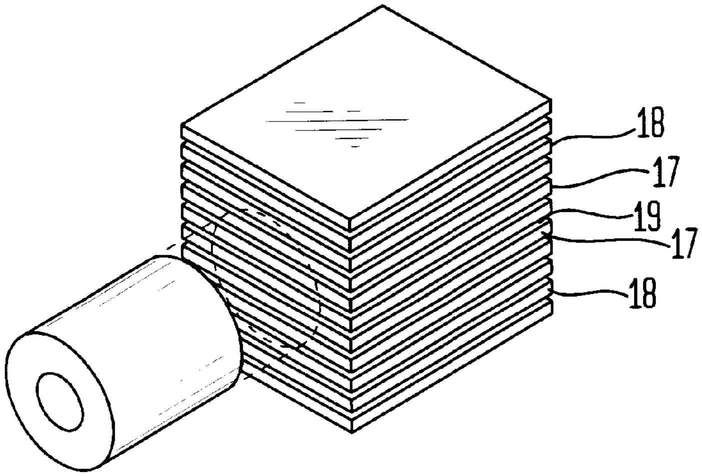
FIG. 10*c* is a perspective view of a toroid being punched from a laminated block.
Figure 10B:
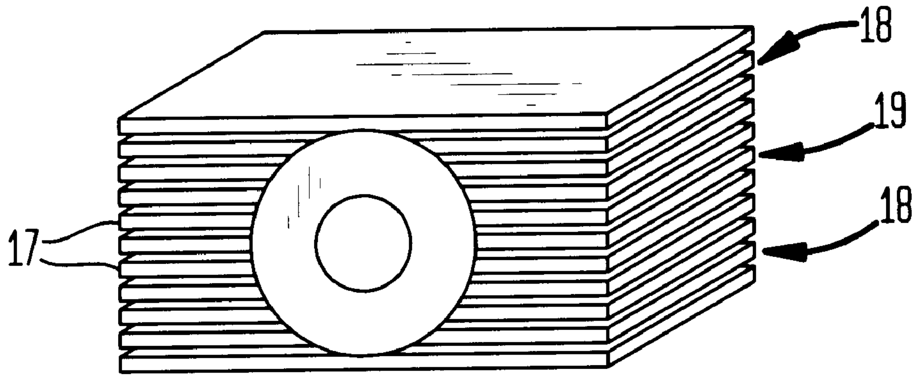
FIG. 10*b* is a perspective view of a laminated block including barrier layers.
Figure 10D:
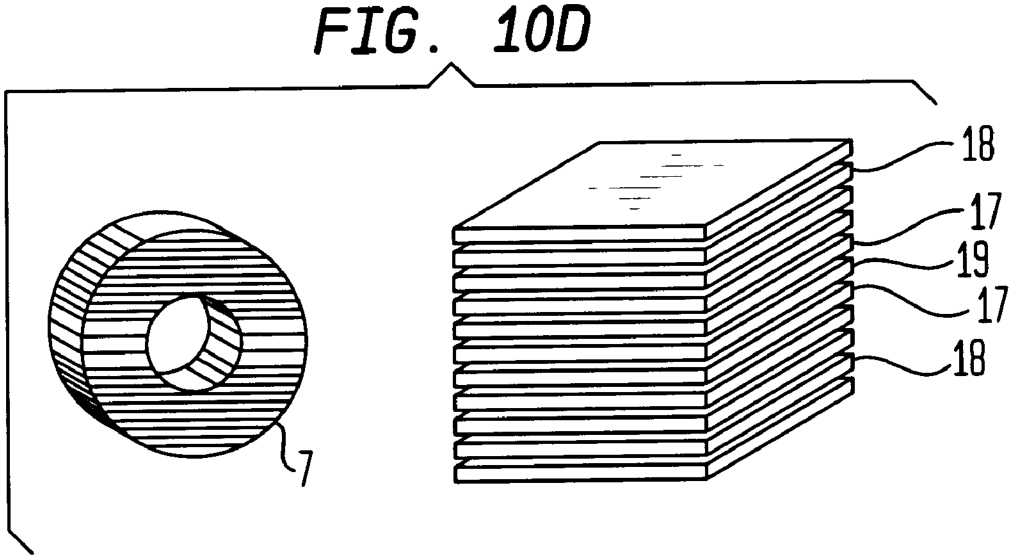
FIG. 10*d* is a perspective view of a "gapped" toroid and its block precursor.

An additional important embodiment of the invention (FIG. 10*c*) is the fabrication of a composite structure in which the non-magnetic, thinner layer is replaced by a magnetic material having magnetic properties different from the primary magnetic ferrite layer. In this embodiment, the two magnetic layers may be of equal thickness, or of quite different thickness. An example of this case would be a "swinging choke", wherein one magnetic material has a much lower saturation magnetization than the other preferably less than one tenth the saturation magnetization. At low fields, both magnetic materials are active, and a relatively constant inductance is achieved. At higher drives, one of the magnetic materials becomes magnetically saturated, and there is a sharp lowered change in inductance.

An additional important embodiment of the invention (FIG. 10*c*) is the fabrication of a composite structure with a diffusion layer 17 between the magnetic ferrite material 18 and the non-magnetic gap material 19. This diffusion barrier comprises a mixture of the base magnetic material and the non-magnetic gap material. In one exemplary embodiment, the diffusion layer 17 is prepared by mix 50 wt % A 16 alumina powder with 50 wt % calcined manganese zinc ferrite powder. One can also produce the diffusion barrier by mixing other proportions of alumina and substituted iron oxide as the application requires. This diffusion barrier layer can be formed by tape casting or other aforementioned comparable sheet forming methods. This diffusion barrier is placed between the magnetic 18 and non magnetic 19 layers during the stacking step and is then laminated into a monolithic body and processing continues in the same manner as the preceding method of the invention. This can be observed in figures 10*a*–10*d*.

Figure 11:
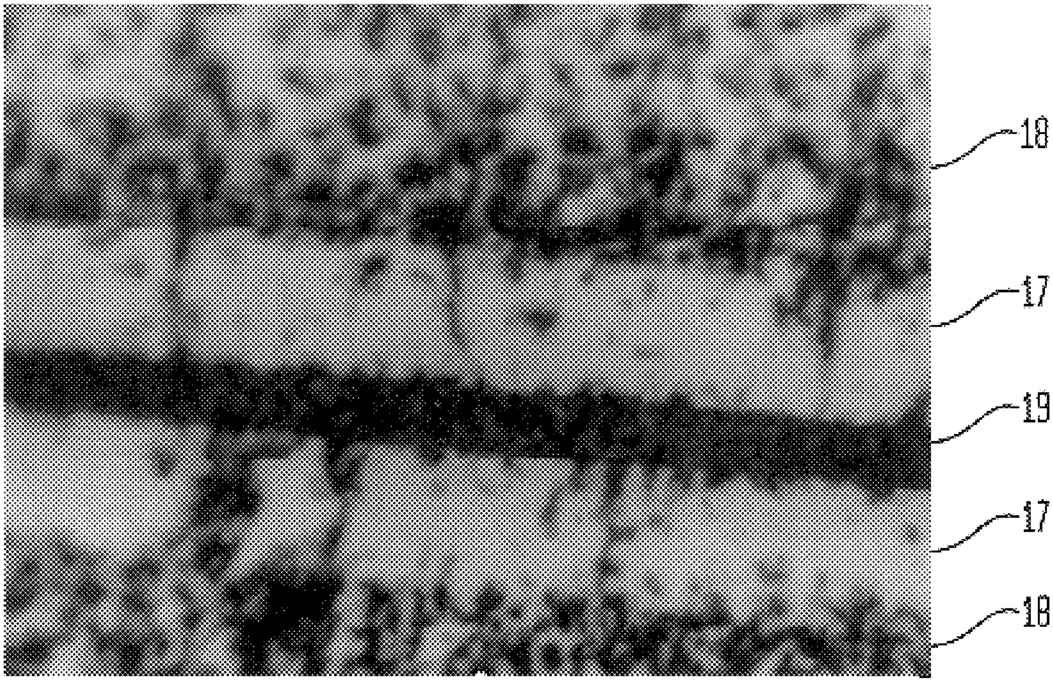
FIG. 11 is a photomicrograph of a section of a barrier layer toroid.
Figure 12:
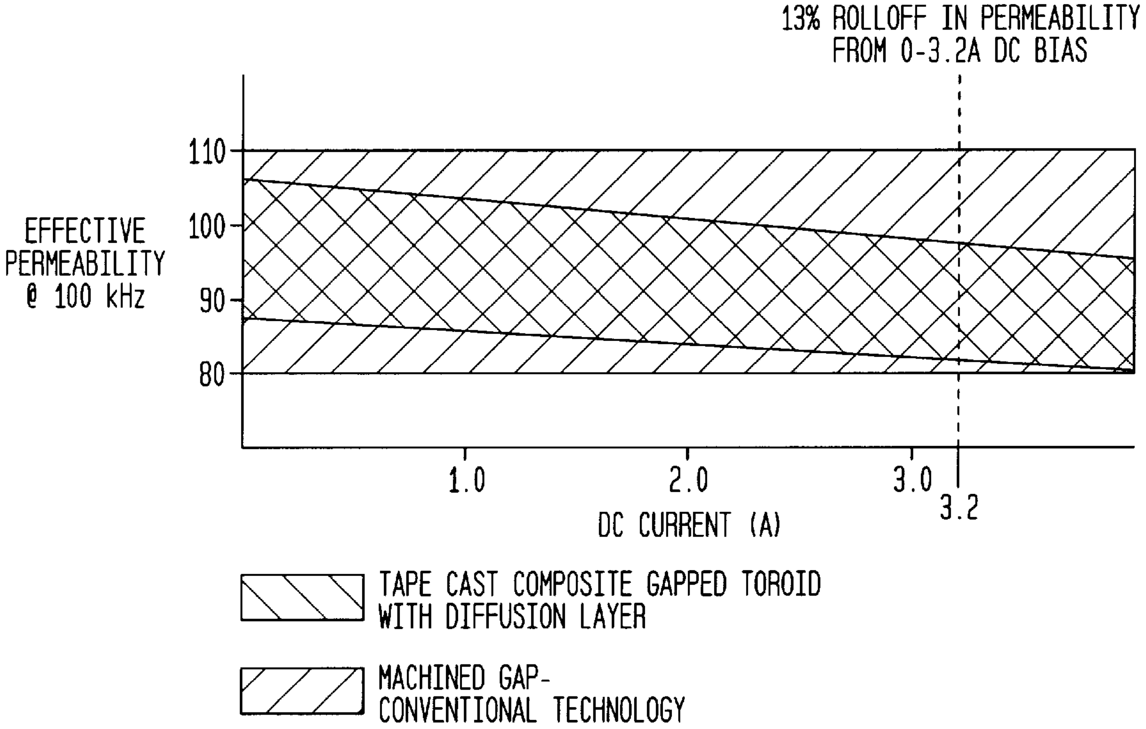
FIG. 12 is a graph of the magnetic properties of a device of the invention.

As shown in FIG. 11, a photomicrograph of a cross section of a gap toroid produced using this method with a diffusion barrier layer present, the diffusion barrier layer impedes the diffusion of the magnetic material into the gap material and the converse. As a result of permeability and power loss of the magnetic material are not adversely effected by migration of the gap material. Also, the gap material does not become magnetic as a result of diffusion of the magnetic material into the gap material.

As an example, a manganese zinc ferrite toroid was produced using the methods of the invention. The toroidal dimensions were approximately 0.395"×0.200"×0.105" outside diameter, inside diameter, and thickness, respectively. The diffusion barrier thickness measured 0.004" and the non-magnetic gap layer measured 0.016" thick. In this example the base magnetic material characteristics were initially permeability of approximately 2000 and a power loss density of 160 mw/cc at 1000 gauss and 100 KHz. The inclusion of the gap structure reduced the effective permeability as expected to approximately 130. When tested for a specific DC Bias current carrying capability of 3.2 Amps the inductance roll off was measured to be approximately 13%.

What is claimed is:

1. A method for the production of a composite magnetic toroid of a selected outer dimension and selected thickness comprising a first magnetic ceramic and a first nonmagnetic ceramic, wherein the method comprises:

a) forming a plurality of first sheets of a precursor to the first magnetic ceramic, defining a plane;

b) forming at least one second sheet of a precursor to the first nonmagnetic ceramic;

c) laminating a plurality of the first sheets and at least one of the second sheets, between the first sheets, to form a green composite body of thickness greater than the selected outer dimension;

d) punching a green magnetic toroid precursor from the green composite body;

e) bisque firing the green magnetic toroid precursor to produce a bisque toroid; and f) sintering the bisque toroid.

2. A method of claim 1 in which the laminating is performed under elevated temperature and pressure.

3. A method of claim 1 in which the green composite body is sliced perpendicular to the plane into slices of thickness greater than the selected thickness of the toroids.

4. A method of claim 3 in which the green magnetic toroid precursor is punched from the slices.

5. A method of claim 1 comprising forming a plurality of third sheets of a precursor to a diffusion barrier ceramic and layering the third sheets in contact with either side of the second sheets.

6. A method of claim 1 in which the first sheets and the second sheets are formed by tape casting.

7. A composite magnetic toroid made by the method of claim 1.

8. A method for the production of a composite magnetic toroid of a selected outer dimension and selected thickness comprising a first magnetic ceramic and a second magnetic ceramic, wherein the method comprises:

a) forming a plurality of first sheets of a precursor to the first magnetic ceramic, defining a plain, b) forming at least one second sheet of a precursor to the second magnetic ceramic;

c) laminating a plurality of the first sheets and at least one of the second sheets to form a green composite body of thickness greater than the selected outer dimension;

d) slicing the green composite body perpendicular to the plane into green slices greater in thickness than the selected thickness of the toroids;

e) punching a green magnetic toroid precursor from the green slices;

f) bisque firing the green magnetic toroid precursor to produce a bisque toroid; and g) sintering the bisque toroid.

9. A method of claim 8 in which the laminating is performed under elevated temperature and pressure.

10. A method of claim 8 comprising forming a plurality of third sheets of a precursor to a buffer ceramic and layering the third sheets contacting either side of the second sheets.

11. A method of claim 8 in which the saturation magnetization of the second magnetic ceramic is less than one tenth of the saturation magnetization of the first magnetic ceramic.

12. A method for the production of a composite magnetic toroid of a selected outer dimension and thickness comprising a first magnetic ceramic and a second magnetic ceramic, wherein the method comprises:

a) forming at least one first sheet of a precursor to the first magnetic ceramic, defining a plane;

b) forming at least one second sheet of a precursor to the second magnetic ceramic;

c) forming a plurality of third sheets of a precursor to a buffer ceramic and layering the third sheets between the first sheets and the second sheets;

d) laminating the first sheets, the second sheets and the third sheets to form a green composite body of thickness greater than the selected thickness;

e) punching a green magnetic toroid precursor from the green composite body in a direction perpendicular to the plane;

f) bisque firing the green magnetic toroid precursor to produce a bisque toroid; and sintering the bisque toroid.

13. A composite toroid made by the method of claim 12.

14. A method for the production of a composite magnetic toroid of a selected outer dimension and selected thickness comprising a first magnetic ceramic and a first nonmagnetic ceramic, wherein the method comprises:

a) forming a plurality of first sheets of a precursor to the first magnetic ceramic, defining a plane;

b) forming at least one second sheet of a precursor to the first nonmagnetic ceramic;

c) interposing at least one second sheet between a first group of first sheets and a second group of first sheets in a plane perpendicular to the plane of the first sheets and laminating the first sheets and the second sheet to form a green composite body of thickness greater than the selected outer dimension;

d) punching a green magnetic toroid precursor from the green composite body;

e) bisque firing the green magnetic toroid precursor to produce a bisque toroid; and f) sintering the bisque toroid.

15. A method of claim 14 in which the laminating is performed under elevated temperature and isostatic pressure.

16. A method of claim 14 in which the composite body is sliced perpendicular to the plane and perpendicular to the at least one second sheets, into slices of thickness greater than the selected thickness of the toroids.

17. A composite magnetic toroid made by the method of claim 14.

18. A method for the production of a composite magnetic toroid of a selected outer dimension and selected thickness comprising a first magnetic ceramic and a first nonmagnetic ceramic, wherein the method comprises:

a) forming a plurality of first sheets of a precursor to the first magnetic ceramic, defining a plane;

b) forming at least one second sheet of a precursor to the first nonmagnetic ceramic;

c) laminating a plurality of the first sheets and at least one of the second sheets, between the first sheets, to form a green composite body of thickness greater than the selected outer dimension;

d) slicing the green composite body perpendicular to the plane into green slices greater in thickness than the selected thickness of the toroids;

e) punching a green magnetic toroid precursor from the green slices;

f) bisque firing the green magnetic toroid precursor to produce a bisque toroid; and g) sintering the bisque toroid.

* * * * *